United States Patent Office 2,804,577
Patented Aug. 27, 1957

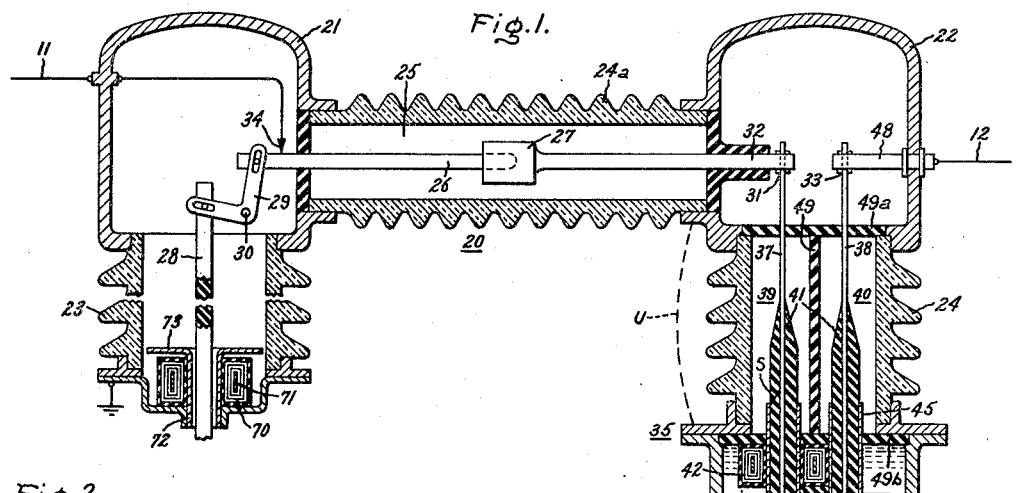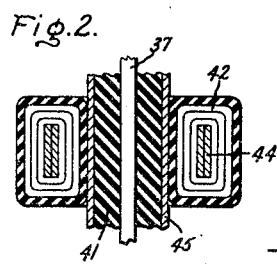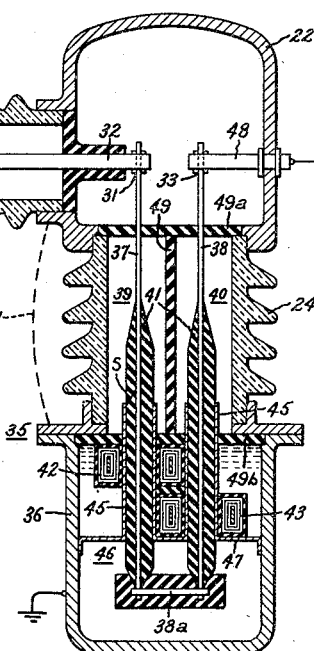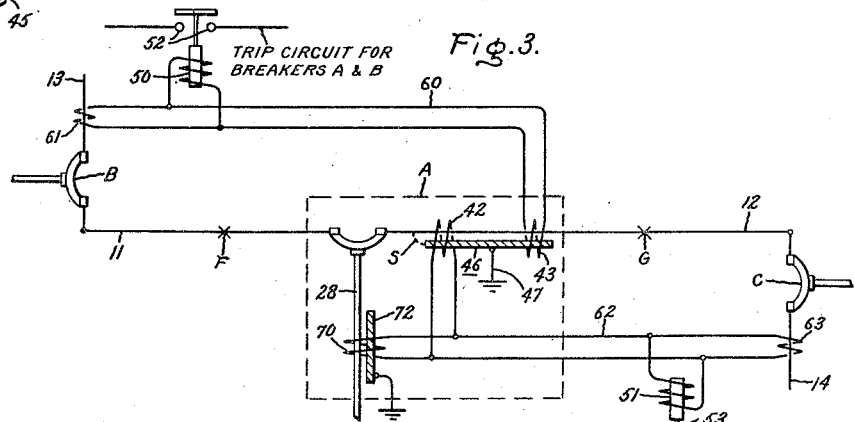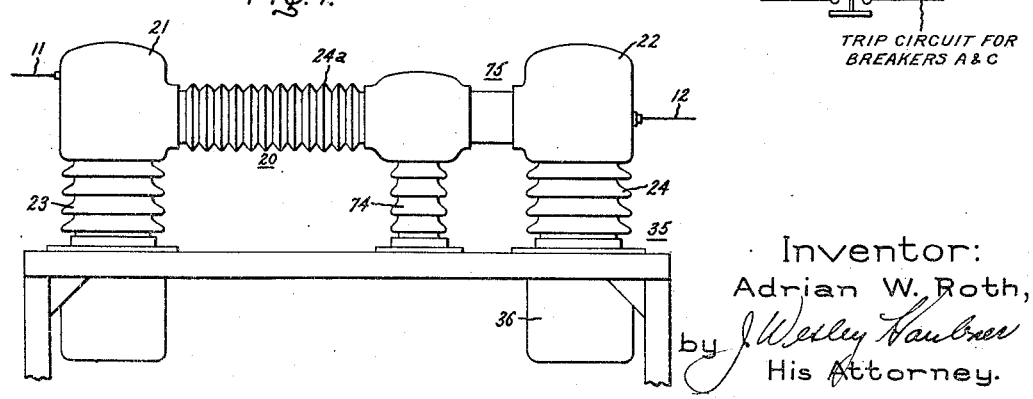

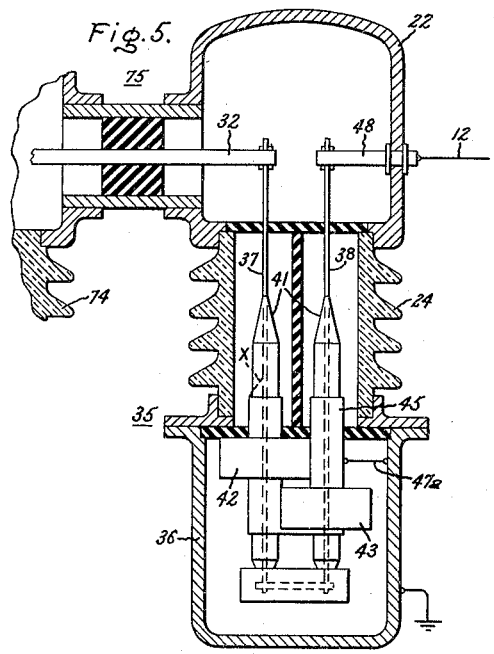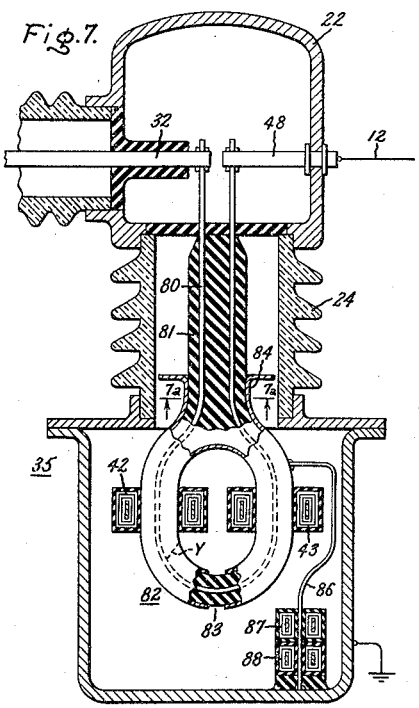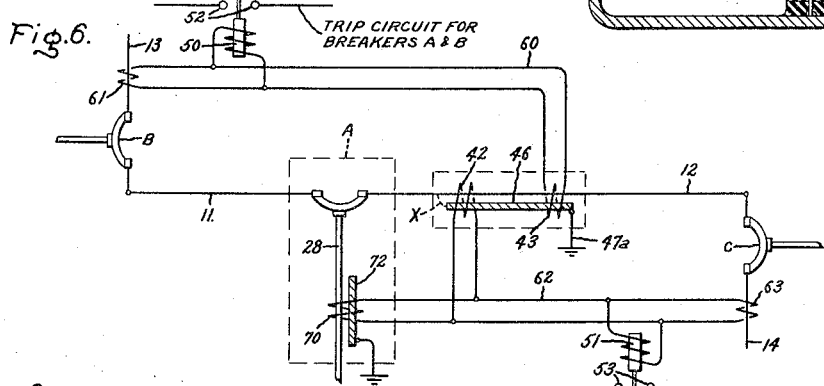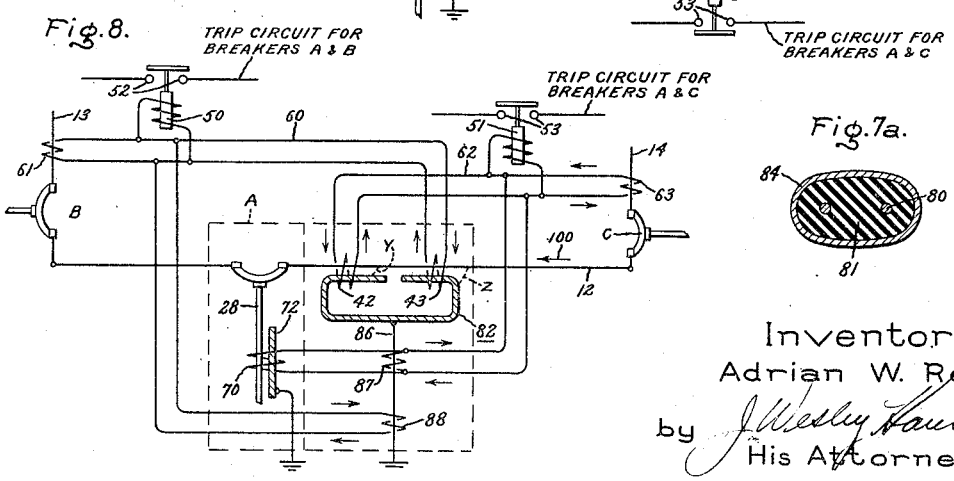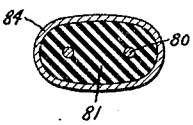

2,804,577

ELECTRIC PROTECTIVE EQUIPMENT

Adrian W. Roth, Aarau, Switzerland, assignor to General Electric Company, a corporation of New York Application May 25, 1954, Serial No. 432,127

27 Claims. (Cl. 317—28)

This invention relates to protective equipment for electric power circuits and, more particularly, to a new and improved current transformer arrangement and construction which will provide correct operation of the protective equipment for substantially all fault conditions.

To facilitate an understanding of my invention, I have illustrated and described the invention as being utilized in differential relaying circuits having current transformer windings which are directly connected. However, it will be apparent to those versed in the protective relaying art, that the invention is equally applicable to relaying equipment in which the windings are interrelated by any desired signal transmission channel over which information may be conveyed conductively or electromagnetically to effect relay operation. Examples of such protective systems are the conventional wire-pilot and carrier-current pilot types of relaying equipment. Since all of these types of relaying equipment operate on a differential principle they are referred to generically hereinafter as being of the differential protective type.

Some of the problems solved by my invention should become apparent from the following description of certain limitations of conventional differential protective equipment. For example, for sensing a fault in a given zone of an electric power circuit, it is conventional to mount a pair of current transformer windings at opposite ends of the zone and to connect the windings in a differential protective circuit. A relay suitably connected in such a differential circuit will operate in response to a fault occurring inside this protected zone but will remain inactive if the fault is external to this protected zone. Where it is desired to provide a pair of such protected zones in the power circuit, a pair of such differential protective circuits are used. The current transformer windings of these circuits are usually arranged in locations such that the pair of protected zones overlap, i. e., one protected zone extends into the other protected zone so as to form a zone of overlap common to both protected zones. With such an overlapping protective system, faults occurring within the zone of overlap are sensed by both differential protective circuits, whereas those in only a single protective zone are sensed only by the single differential protective circuit protecting that particular zone. Thus, such an overlapping system can distinguish between faults within the zone of overlap, and faults external thereto; and can further distinguish between those external faults occurring at one side of the overlap zone, and those external faults occurring at the other side of said overlap zone.

Where it is desired to distinguish between faults occurring within a circuit breaker and those external thereto and to further distinguish between those external faults occurring at one side of the breaker and those external faults occurring at the other side of the breaker, it has been proposed heretofore to arrange a pair of current transformer windings of such an overlapping system at opposite terminals of the circuit breaker so that the zone of overlap is co-extensive with the internal circuit of the circuit breaker. Such an arrangement is exemplified by the tank-type circuit breaker having bushing-type current transformers mounted on each of its terminal bushings. In such an arrangement, substantially all faults occurring in the internal circuit of the circuit breaker will be faults in the overlap zone, which the system can distinguish from faults external to the breaker, the latter of which are faults located in only one protected zone, i. e., beyond either end of the overlap zone. Some circuit breakers, however, have no bushings, and thus do not lend themselves to the use of current transformer windings at opposite terminals, or bushings. From the standpoint of economy, it is desirable in such breakers to mount the pair of windings in a single insulating housing disposed at one side of circuit breaker. In such an arrangement, the zone of overlap is not co-extensive with the internal circuit of the circuit breaker, and hence, unless certain modifications are made in the protective system, incorrect operation will take place for certain fault conditions, e. g. the occurrence of faults internal to the circuit breaker but external to the overlap zone.

Where the differential protective equipment for an electrical system comprises a pair of current transformer windings for a particular circuit breaker, it is a primary object of this invention to construct the protective equipment in such a manner that these current transformer windings can be mounted in a single insulating housing disposed at one side of the circuit breaker and yet be effective to correctly operate the protective equipment in response to substantially all circuit fault conditions.

Another object of the present invention is to shield the current transformer windings of such a current transformer assembly in such a manner that the windings may be mounted within the housing in a relatively inexpensive and structurally simple manner without affecting the ability of the windings to correctly operate associated protective equipment in reponse to faults occurring at any location within said housing.

A further object of this invention is to construct the current transformer windings of such an assembly in such a manner that these windings consistently produce the same operation of the associated protective equipment in response to substantially all faults occurring within the current transformer housing regardless of the location of the fault within the housing.

Where exposed metal encloses the two terminals of the current transformer assembly and the connection between a first one of said terminals and the circuit interrupter contacts, it is a further object of this invention to arrange this exposed metal in such a manner that external faults from the exposed metal appear electrically to the current transformer assembly as external faults occurring from the second terminal.

Where the operating rod of a circuit breaker is disposed in such a location that faults occurring along the operating rod are located physically outside the zone of the power circuit protected by a relay controlling power flow into the circuit breaker through one of its terminals, it is an object of this invention to provide a simple means for relaying such a fault as a fault occurring within this protected zone.

Another object of this invention is to effect such relaying of an operating rod fault in a manner which requires no additional relays and no substantial modification of the conventional protective circuit from which such a relay is operated.

In carrying out the present invention in one form there is provided a circuit interrupter having separable interrupting contacts, a current transformer assembly insulating housing mounted at one side of said interrupter and at least partially enclosing an internal circuit which is electrically connected to said interrupting contacts, and a pair of current transformer secondary windings mounted with said insulating housing about the internal circuit of the current transformer assembly. Conductive shielding is insulatingly interposed between said windings and said internal circuit, and this shielding is connected to ground by a conductor extending to ground by a path disposed in a predetermined electrical location with respect to the magnetic circuits of said windings. All faults occurring within the current transformer assembly will flow through the shielding to the ground path in such a manner as to cause the current transformer windings to consistently control associated protective equipment in the same predetermined and correct manner.

Another feature of the present invention has special application to a circuit breaker which is provided with an operating rod located in such a position as to form a possible current path for faults external to the protected zone defined by a pair of current transformer windings connected in a differential protective circuit. In accordance with my invention, a normally deenergized current transformer winding is disposed about said rod and is operatively connected in said differential protective circuit in a manner whereby said circuit effects correct operation of associated protective equipment in response to faults along the operating rod.

Further objects and advantages of my invention will become apparent from the following description of several embodiments of my invention. The features of novelty which characterize my invention will be pointed out with particularity in the claims annexed to and forming a part of this specification.

Fig. 1 is an elevational view in section of one form of circuit breaker assembly embodying current transformer equipment constructed in accordance with the present invention.

Fig. 2 is a detailed sectional view showing a portion of the shielding and one of the current transformer windings of the present invention.

Fig. 3 illustrates in schematic form an electric power system containing the circuit breaker assembly of Fig. 1 and certain additional protective equipment.

Fig. 4 is an elevational view of a modified form of circuit breaker assembly embodying the present invention.

Fig. 5 is a detailed elevational view partly in section of the current transformer assembly for the circuit breaker of Fig. 4.

Fig. 6 illustrates in schematic form an electric power system containing the circuit breaker of Fig. 4 and certain associated protective equipment.

Fig. 7 illustrates another modified form of current transformer assembly for use in a circuit breaker as shown in Fig. 1.

Fig. 7a is a cross-sectional view taken along the line 7—7 of Fig. 7.

Fig. 8 illustrates in schematic form an electric power system which utilizes the current transformer equipment of Fig. 7.

Referring now to the schematic showing of Fig. 3, there is shown, by means of a dotted line block, a circuit breaker A which, for illustrative purposes, is used as a bus-tie breaker which electrically interconnects a pair of bus sections 11 and 12. In the usual electric power system, a plurality of electric circuits, which may be either feeder or distribution circuits for respectively supplying electrical energy to or from the bus, are connected to each of the bus sections, but for simplicity, I have shown only a single circuit 13 connected to bus section 11 and a single circuit 14 connected to bus section 12. Circuit 13 is interconnected to bus section 11 through a remote circuit breaker B, and circuit 14 is interconnected to the bus section 12 through a remote circuit breaker C. For the purpose of this description, these remote circuit breakers may be of a conventional construction and, hence, are shown in schematic form only. It is desirable to isolate only the faulty portion of the electrical power system upon the occurrence of a fault condition in order to permit uninterrupted service to be maintained over the remainder of the system. To this end, if a fault should occur in the external portion of the circuit extending between the breakers, only the breakers at the terminals of the faulted external circuit portion should open. For example, should a fault occur at F, it would be necessary to open only breakers A and B, whereas breaker C should desirably remain operatively connected to its bus section. Thus, circuit 14, if a feeder circuit, could continue to supply power through bus section 12 to any other circuit (not shown) suitably connected to bus section 12. Such other circuit would ordinarily be connected to the bus section 12 through a circuit breaker (not shown) controlled by a suitable current transformer winding connected into the hereinafter-described protective circuit 62 in a conventional manner, such as is disclosed in application Serial No. 353,358, filed by T. R. Coggeshall and H. Bany on May 6, 1953, and assigned to the assignee of the present invention. In a corresponding manner, if a fault should occur at G instead of F, it would be necessary to open only breakers A and C, whereas breaker B should remain operatively connected to its bus section 11 whereby to permit this bus section to remain energized. Now should a fault occur internal to the circuit breaker A, which is a fault likely to impair the interrupting ability of breaker A, then it would be necessary to open breakers A, B and C in order effectively to isolate and clear the fault. Thus, it will be apparent that in order to provide the desired selectivity in operating the circuit breakers, it is important that the protective system be capable of distinguishing between faults internal to a circuit breaker and those external thereto and to further distinguish between those external faults at one side of the breaker and those external faults at the other side. Features of the protective equipment which provide this desired selectivity of operation will become apparent as the description proceeds.

Although I have chosen to distinguish between external and internal faults in the above discussion, this line of distinction has been chosen primarily to simplify the discussion, and, secondarily, because in most cases this distinction should govern the desired manner of relay operation. The secondary reason is based upon the fact that, in most circuit breaker designs, faults internal to the circuit breaker are likely to impair the interrupting ability of the circuit breaker, whereas faults external to the circuit breaker are highly unlikely to impair the interrupting ability of the breaker. In a few circuit breaker designs, however, certain internal faults are unlikely to impair the interrupting ability of the breakers. In such designs, the relay system should treat such internal faults in the same manner as the external faults. For example, in the hereinafter described embodiment of Figs. 4-6, I have distinguished between faults likely to impair the breaker's interrupting ability and those unlikely to do so, without particular regard for whether these faults are external or internal to the circuit breaker. Accordingly, I do not wish to limit my invntion to protective equipment which distinguishes only between internal and external circuit breaker faults.

As shown in Fig. 1, the bus tie breaker A comprises a horizontally extending circuit interrupter 20 supported at opposite ends by metallic housings 21 and 22 which are, in turn, respectively supported on vertically extending tubular insulating columns 23 and 24. The circuit interrupter 20 comprises a horizontally extending cylindrical insulator 24a defining an interrupting chamber 25 in which are mounted a pair of relatively movable interrupting contacts 26 and 27 which are separable to normally effect interruption of the circuit through the breaker. For moving contact 26 relative to contact 27 so as to effect the desired contact separation, there is provided a reciprocable operating rod 28 of insulating material disposed within insulating column 23 and actuated by any suitable conventional operating mechanism (not shown). Reciprocatory motion of the operating rod 28 is transmitted to the movable contact 26 by means of a crank 29 which operatively interconnects the operating rod and the contact and is pivoted about a fixed pivot pin 30. Thus, when the operating rod 28 is moved downward in response to tripping of the circuit breaker, the contacts 26 and 27 are separated to effect circuit interrupton. A circuit breaker of this general type is described in greater detail in U. S. Patent 2,162,588 to Prince, which is assigned to the assignee of the present invention.

The current transformer equipment for the circuit breaker of Fig. 1 is mounted within an insulating housing 35 which is defined by the vertical insulating column 24 and a metallic supporting tank 36. This housing 35 is filled with an insulating fluid in which the various components of the elements forming the current transformer assembly are immersed. The primary conductor of the assembly comprises a pair of conducting studs 37 and 38 of a pair of spaced apart vertically extending bushing cores 39 and 40 and a suitable conductor 38a electrically interconnecting the lower ends of the studs 37 and 38. As will be apparent from Fig. 1, this primary conductor is of a loop-shaped or U-shaped form. Each bushing core further comprises suitable insulation 41 wound about its stud. A vertically extending insulating plate 49 extends generally diametrically across the bore of the porcelain column 24. This plate 49 cooperates with horizontally extending insulating plates 49a and 49b at opposite ends of the porcelain column, whereby to sectionalize the column into a pair of vertically extending insulating compartments, each of which encloses the upper portion of one of the bushing cores. The walls of the insulating compartments effectively isolate each of the bushing cores from any fault which might occur in the other bushing core for reasons which will appear more clearly hereinafter.

The upper end of stud 37 defines a circuit interrupter terminal 31 for the current transformer assembly, and this terminal is suitably connected to stud 32 of the circuit interrupter. Similarly, the upper end of stud 38 defines a line terminal 33 of the current transformer assembly, and this terminal is electrically connected, through structure comprising an adapter 48, to the bus section 12.

Thus, it may be seen that the electric circuit through the circuit breaker A is as follows: From the bus section 11 current will flow through a suitable sliding contact 34 (schematically shown) to the movable contact 26, then through stationary contact 27 and the conducting stud 32 to one terminal 31 of the current transformer assembly, then through the primary conductors 37, 38a, 38 of the current transformer assembly to the line terminal 33, the adapter 48, and thence to bus section 12.

Referring now in greater detail to the current transformer assembly; mounted about the bushing cores 39 and 40 are a pair of secondary windings 42 and 43 of a pair of bushing-type current transformers. From the detailed view of Fig. 2, it may be seen that winding 42 is wound about an annular magnetic core 44 which encompasses the bushing core 39. The turns of the winding are insulated from each other and from the core in a conventional manner. The construction of winding 43 is substantially identical to that of winding 42.

It will be apparent from Fig. 1 that the current transformer windings 42, 43 are arranged about the bushing cores 39 and 40 in such a manner as to permit the use of a porcelain column 24 of a comparatively small diameter, whereby it is possible to effect a substantial saving in the cost of this porcelain column. Specifically, by disposing the windings in vertically staggered locations on the bushing cores, it is possible to minimize the lateral spacing between the bushing cores so that the cores are laterally separated only by the radial thickness of a single one of the windings, thus, requiring only a comparatively small porcelain column to enclose the bushing cores. Additionally, because the windings are located vertically below the porcelain column 24, it is possible to even further reduce the internal diameter of the porcelain without interference from these windings.

Between each of the windings 42 and 43 and its bushing core, there is interposed a tubular conductive shielding element 45. These tubular shielding elements are electrically connected at their lower ends by suitable conductive structure. This interconnected shielding structure generally indicated by 46 is electrically connected through the tank sidewalls to ground by conductors 47, each of which extend to ground by a path which is disposed electrically between the windings 42 and 43. The importance of this shielding and the disposition of the ground path will appear more clearly as the description proceeds. Preferably the grounded conductors 47 are constructed as rigid radial straps which are secured to the tank 36 so as to form a support for the shielding and the current transformer windings 42 and 43. In Fig. 3 the shielding 46 and the ground conductor 47 are shown in diagrammatic form and with reference numerals corresponding to those used in Fig. 2.

In order to protect the electrical system shown in Fig. 3, differential relays 50 and 51 are provided for selectively or collectively controlling the tripping of the circuit breakers A, B and C. For this purpose, differential relay 50 includes normally-open contacts 52 which, when closed, establish a tripping circuit for circuit breakers A and B. Similarly, differential relay 51 includes normally-open contacts 53 which, when closed, establish a tripping circuit for circuit breakers A and C. To those skilled in the art, it will be obvious that each of the circuit breakers controlled by a particular tripping circuit may have an electromagnetically-controlled latch which is released to effect breaker opening in response to current flow through this particular tripping circuit. Accordingly, for the purposes of simplifying this description, these conventional details of the tripping circuits have been omitted.

Energization and operation of the relay 50 is effected from a differential protective circuit 60 including the current transformer secondary winding 43 of the breaker A and the current transformer secondary winding 61 of the breaker B. Each of these secondary windings 43 and 61 is energized in accordance with the value of current flowing in the portion of the primary conductor about which each secondary winding is disposed. As is well known in the art, the secondary windings are connected in such a manner that when these primary current values are vectorially equal, current merely circulates between the windings 43 and 61 of the protective circuit 60, as a result of which the coil of relay 50 receives no effective current and remains deenergized. However, if these primary current values become unequal by a vector difference exceeding a predetermined amount, sufficient current will flow through the coil of relay 50 to operate the relay, thereby to close its contacts 52 and establish a trip circuit for breakers A and B. This equal primary current condition will exist so long as no fault is present in the zone of the power circuit extending between windings 61 and 43. However, should a fault, such as at F, occur in this zone, the current flowing into the zone through one of the primary conductor portions would no longer be vectorially equal to the current flowing out of the zone through the other primary conductor portion. The resulting vector difference would produce a current flow in the differential protective circuit 60 which would be such as to operate the differential relay 50 so as to effect tripping of breakers A and B. Thus, the differential relay 50 will operate in response to any fault occurring within the protected zone of the power circuit extending between the windings 61 and 43. Differential protective circuits of this general kind are well known.

Similarly, energization of the other differential relay 51 is effected from a differential protective circuit 62 including the current transformer windings 63 and 42. The winding of relay 51 is connected in its protective circuit in the same manner as described with respect to relay 50, so that should a fault occur in the protected zone of the power circuit extending between windings 63 and 42, such as at G, the relay 51 would operate to close and thereby trip breakers A and C.

From this description of the operation of the differential protective circuits 60 and 62, it will be apparent that there are two protected zones in the power circuit, one zone extending between winding 61 and 43 and the other zone extending between winding 42 and 63. From this it will be apparent that these two protected zones "overlap," that is, one zone extends into the other zone, and the portion of the power circuit extending between the windings 42 and 43 is therefore common to both zones. This common zone is known as the zone of overlap. Any fault occurring within this overlap zone will energize both relays 50 and 51, whereas a fault in a single one of the protected zone will energize only a single one of the relays. Thus, it will be apparent that an overlapping protective system can distinguish between faults occurring in the zone of overlap and those occurring outside of this zone. As previously pointed out, it can further distinguish between faults occurring on one side of the zone of overlap and faults occurring on the other side thereof.

Since it is most desirable for the differential protective equipment to distinguish between faults internal to the circuit breaker and those external thereto, it will be apparent that if windings 42 and 43 could be mounted at opposite terminals of the breaker, the zone of overlap would be co-extensive with the internal circuit of the braker, and accordingly such an overlapping system could distinguish between internal and external faults. Certain types of breakers, such as the tank type of breaker, lend themselves to mounting the current transformer windings at opposite terminals and thus approach the ideal condition. However, in certain breaker designs, such as the one shown, for example, in Fig. 1, the terminal structures do not readily lend themselves to the mounting of current transformer windings. With the type of breaker shown in Fig. 1, it is most economical that the overlapping current transformer windings be mounted within a single insulating housing disposed at one side only of the breaker. In such an arrangement, it is apparent that the zone of overlap extends over only a minor part of the internal circuit of the breaker, and hence, unless certain modifications are made, inadequate or incorrect operation of the protective system will take place upon the occurrence of faults in the internal circuit of the breaker located outside of the zone of overlap.

In accordance with the present invention, a solution to this problem has been effected by the use of the grounded shielding 46 within the current transformer assembly. To explain further, in a circuit breaker in which the housing of the current transformer assembly is used as a support for the interrupter (as is shown, for example, in Fig. 1 where the housing 35 supports the interrupter 20) a fault occurring within the current transformer assembly is considered to be a fault in the internal circuit of the breaker and one which is likely to impair the interrupting ability of the breaker. Hence, both differential relays 50 and 51 should operate to trip open circuit breaker A and also circuit breakers B and C on both sides of the breaker A so as to prevent current from being fed into the fault from either circuit 13 or circuit 14. This desired operation of the protective equipment is achieved by forcing all faults occurring within the current transformer housing 35 to be conducted to ground by a path which extends electrically between the current transformer windings 42 and 43, so that such faults will appear to the current transformer windings as a fault occurring in the overlap zone. For example, assume as internal fault to ground occurs at S, Figs. 1 and 3, when power is flowing from circuit 13 through the bus section 11 to bus section 12. The winding 61 of the B breaker will receive full fault current and the winding 42 of the A breaker will also receive the same full fault current since the shielding 46 provides a current path to ground which is encompassed by the magnetic core of the winding 42. At the same time, current transformer windings 43 and 63 would receive zero fault current since current from bus section 11 is diverted to ground without entering the portion of the power circuit extending between these windings, 43 and 63. Thus, since winding 61 receives full fault current and winding 43 receives zero fault current, differential relay 50 will operate. Similarly, since winding 42 receives full fault current and winding 63 receives zero fault current, differential relay 51 will operate. Thus, both differential relays operate in response to a fault internal to the current transformer assembly at S, as is desired. It will also be observed that even though S is outside the overlap zone of the power circuit, both differential relays operate, as is desired.

The same operation of the differential relays 50 and 51 takes place if the flow of power be assumed as from circuit 14 through bus section 12 to bus section 11 when the fault at S occurs. For example, under such an assumption, windings 63 and 43 receive full fault current since full fault current flows in the portions of the primary conductor surrounded by each of these windings, 43 and 63. Under these conditions, however, winding 42 effectively receives zero fault current since the current flowing through the shielding 46 in effect cancels out the current flowing in a reverse direction through the primary conductor (stud 37). Winding 61 would also receive zero fault current since current is diverted to ground through the shielding 46, 47 before reaching winding 61. Thus, since winding 63 receives full fault current and winding 42 receives zero fault current, relay 51 will operate. Similarly, since winding 43 receives full fault current and winding 61 receives zero fault current, differential relay 50 will operate. Thus, both relays operate in response to a fault at S regardless of the direction of current flow into the fault, as is desired.

Although the operation of the protective system has been explained in detail only for faults occurring at S, it will be apparent that a fault occurring at any location within the current transformer assembly which is conducted to ground through the shielding 46 will cause the protective equipment to operate in the same manner as described with respect to the fault at S. That is, both differential relays 50 and 51 will operate in response to any fault current flowing to ground through shielding 46. In order to insure that all faults occurring within housing 35, even those which are outside the zone of overlap, will flow to ground through a path located electrically between the windings 42, and 43, the shielding tubes 45 project substantially above the bottom of the porcelain column 24 so that any fault current which might possibly flow down the porcelain column 24, or down the bushing core insulation 41, or down the barrier 49 between the cores 39 and 40, will pass through the shielding 46. When this fault current passes through the shielding 46, it is conducted to ground by a conductor 47 forming a path which extends electrically between the windings 42 and 43 so as to always yield the desired correct operation of the protective equipment. Thus, since all faults occurring within the housing 35 of the current transformer assembly will be conducted to ground by a path extending electrically between windings 42 and 43, it will be apparent that both differential relays 50 and 51 will operate in response to substantially all faults occurring within the current transformer assembly, as is desired for the circuit breaker arrangement of Figs. 1 through 3.

In a circuit breaker constructed as shown in Fig. 1, the only likely locations in which a fault might occur from the internal circuit of the breaker so as to render it inoperative are either in the supporting current transformer assembly or adjacent the operating rod 28. As for those faults occurring within the current transformer assembly, grounded shielding 46, 47 directs the fault current to ground in a manner which yields correct relaying, as pointed out hereinabove. As for those faults occurring along or adjacent the operating rod 28; in accordance with the present invention, there is provided supplementary protective means including a normally-deenergized current transformer winding 70 which becomes energized by fault currents flowing toward ground along the operating rod 28. This winding 70, shown in both Figs. 1 and 3, is connected into the differential protective circuit 62 across the terminals of winding 42 and with its polarity preselected in such a manner that when winding 70 is energized by current flow along the operating rod, this winding induces a secondary current in the protective circuit 62. If windings 63 and 42 are energized at this time, this secondary current from winding 70 cancels, or in effect neutralizes, the current flow induced by one of the other windings, e. g. winding 42, whereby to permit the remaining winding (63) to energize relay 51. Alternatively, in the event that windings 42 and 63 are deenergized at the time winding 70 becomes energized by an operating rod fault current, then the current flowing from winding 70 alone operates differential relay 51.

The importance of operating relay 51 in response to fault currents along the operating rod will be apparent when it is considered that faults taking place along the operating rod are faults which are likely to impair the interrupting ability of the circuit breaker and, hence, the remote circuit breakers B and C at both sides of the bus tie breaker A should be opened to prevent current from being fed into the fault from either bus section. The fault occurring along the operating rod 28 of the circuit breaker of Fig. 1 is a fault located outside of the zone of overlap and on the left side thereof, and accordingly, without the current transformer winding 70, it would operate only the remote breaker B on the left hand side of the bus tie breaker A. However, by utilizing a current transformer winding 70 in accordance with the present invention, it is possible, without necessitating additional relay equipment, to open the remote breaker C on the right hand side of the bus tie breaker A as well as the remote breaker B on the left hand side of the breaker A, thus opening both remote breakers, as desired. To illustrate, by way of a specific example, the operation of the protective equipment in response to faults occurring along the operating rod, assume that power is flowing from circuit 13 through bus section 11 to bus section 12 at the time a fault takes place along the operating rod 28. By referring to Fig. 3, it will be seen that under such conditions, the current transformer winding 61 receives full fault current whereas its associated current transformer winding 43 receives zero fault current thereby causing operation of differential relay 50. With respect to differential relay 51, both current transformer windings 42 and 63 receive zero fault current, but operating rod winding 70 receives full fault current thereby causing operation of relay 51. Thus, for a fault along the operating rod with power flowing from bus section 11 to bus section 12, both differential relays 50 and 51 are operated and, as a result, remote breakers on both sides of the faulted breaker A are opened, as is desired. The same operation takes place if power be assumed as flowing from circuit 14 through bus section 12 to bus section 11 when a fault occurs along the operating rod 28. For example, under such conditions, winding 43 would receive full fault current whereas current transformer winding 61 would receive zero fault current thereby causing operation of relay 50. With respect to differential relay 51, windings 63, 42, and 70 would receive full fault current but since windings 70 and 42 neutralize each other, current from winding 63 would energize relay 51. Thus, as desired, both differential relays 50 and 51 would operate in response to a fault along the operating rod regardless of the direction of power flow into this fault.

Since I have shown by specific examples that both relays 50 and 51 operate correctly if power is assumed to be flowing into the operating-rod fault from either side of circuit breaker A, it will be apparent to those versed in the art that correct operation of the relays will also occur when power is assumed to be flowing into the fault from both sides of the breaker A at a given instant.

To insure that fault currents which flow to ground in the vicinity of the operating rod 28 will follow a path which is encompassed by the magnetic core 71 of transformer winding 70, there is provided a grounded tubular shield 72 which is interposed between the operating rod 28 and the current transformer winding 70. This shield 72 has an annular flange 73 at its upper end which extends into closely adjacent relationship with the porcelain column 23 whereby to intercept fault currents which might flow down the internal surface of the column 23 by a path tending to bypass the magnetic circuit of the current transformer winding 70. If such fault currents were permitted to bypass winding 70 incorrect operation of the protective equipment might occur.

The use of such a shield as 72 also permits less insulation to be used in the winding 70 since the fault current which flows through the magnetic circuit of winding 70 flows through the metal shield rather than as an arc along the operating rod. Although the use of shield 72 is preferred, where the above considerations are not significant, it is permissible to omit this shield.

Still another feature of the circuit breaker of the present invention is that faults which take place from the exposed metal dome 22 of the circuit breaker are properly relayed by the protective equipment, i. e., as external faults occurring on the right hand, or bus section 12, side of the breaker. Although portions of the dome 22 might appear to be physically located in the zone protected by the protective circuit 60 on the left hand side of the breaker, it will be apparent that faults occurring from this dome can be isolated and cleared by operation of the protective equipment for the right hand side of the breaker without operation of that for the left hand side. This is the case because the dome is disposed electrically between the contacts of breaker A and the contacts of the remote breaker C on the right hand side of the breaker A. For example, should a fault, such as U (Fig. 1) occur from dome 22 to ground, this fault can be isolated by operation of breaker A and the right hand remote breaker C without the necessity for opening breaker B. To obtain this desired operation, in accordance with the present invention, the dome 22 is electrically connected to the line terminal 33 on the right hand side of the current transformer assembly and is locally insulated from the other transformer terminal 31. That is, the dome 22 is electrically connected to the primary conductor of the current transformer assembly at the line terminal side only of the primary conductor. The sole electrical connection between the other transformer terminal 31 and the dome 22 is through the current transformer primary conductor and the connection 48 between the line terminal 33 and the dome. Thus, any fault from the dome 22, such as the fault U from the dome to ground, will appear electrically, not as a circuit breaker fault, but as an external fault located in the power circuit between the windings 42 and 63, just as in the case of the fault G. As a result, the fault at U will cause operation of the right hand differential relay 51 with the resulting tripping of breaker A and the right hand remote breaker C; this being all that is required to isolate a fault at U.

An additional function of the exposed metal dome 22 is that it effectively shields the terminal 31 of the current transformer assembly and the conducting stud 32 from the possibility of a fault occurring to ground or to an adjacent phase from either the terminal 31 or stud 32. Since these terminal parts (31 and 32) are enclosed by the dome 22 and since the dome is connected to line terminal 33 and is, therefore, at substantially the same potential as parts 31 and 32, it will be apparent that there is little or no likelihood that any fault can occur from these parts to a point external to the dome.

In Figs. 4, 5, and 6 there is shown another modification of a circuit breaker constructed in accordance with the present invention with its parts being designated by the same numerals as corresponding parts in Figs. 1 and 2. In this modified form of circuit breaker, a separate insulating column 74 supports the right hand end of the circuit interrupter 20, whereas the current transformer assembly housing 35 constitutes an accessory which does not function as a support for the circuit interrupter. As a result, faults within the current transformer housing are unlikely to impair the interrupting ability of the circuit breaker. Accordingly, in response to a fault within the current transformer housing, only the remote breaker C on the current transformer side of the bus tie breaker A need be opened in addition to breaker A. In order to operate the protective equipment in the desired manner which satisfies the requirements of this modified form of breaker, certain modifications must be made in the current transformer shielding 46 of Fig. 1. More particularly, referring to Fig. 5, the shielding tube 45 which extends through the magnetic core of the current transformer winding 43 is connected to the grounded tank 36 by a conductor 47a extending from the tank to a point on the tube 45 which is located electrically at the line terminal side of the current transformer winding 43. By reason of this connection, all faults within the current transformer assembly housing 35 must ground through 47a and for this reason will appear electrically to the current transformer windings 42 and 43 as faults which have occurred outside of and electrically on the right hand side of the overlap zone between the windings 42 and 43. As a result, only the differential relay 51 on the right hand side of the circuit breaker A will operate. Accordingly, only the circuit breaker A and the circuit breaker C will trip, whereas the circuit breaker B on the left hand side of the bus tie breaker A will desirably remain connected to the bus section 11. To further illustrate, by way of a specific example, assume that a fault occurs at X within the current transformer assembly. (See Figs. 5 and 6.) If current be assumed as flowing from circuit 14 through bus section 12 to bus section 11 at the time the fault at X occurs, then it will be apparent that winding 42 will receive zero fault current whereas winding 63 will receive full fault current, thereby resulting in the operation of differential relay 51, as desired. The reason that winding 42 receives zero fault current is that the current flowing through the shielding 46, in effect, cancels out the current flowing in a reverse direction through the stud 37, and as a result, no effective current is induced in the winding 42. Assuming still that a fault occurs at X when current is flowing from circuit 14 through bus section 12 to bus section 11, winding 43 will receive zero fault current, as will winding 61 thereby causing the differential relay 50 to remain inactive. Thus, it may be seen that in response to a fault such as at X within the current transformer assembly only the differential relay 51 on the right hand side of the breaker will operate, as is desired. The same operation of the protective system will result even if current be assumed as flowing from circuit 13 through bus section 11 to bus section 12 at the time the fault at X occurs. Similarly, notwithstanding the location of the fault within the current transformer assembly it will always be conducted to ground by shielding 46 and the conductor 47a. These conductive parts always provide a path to ground which is located electrically at the line terminal side of the current transformer assembly, and, hence, fault currents flowing through this path will operate only the differential relay (51) on the line terminal side, as is desired.

In the circuit breaker of Figs. 4, 5, 6 the only faults which are likely to impair the interrupting ability of the breaker would be faults occurring along or adjacent the operating rod 28 of the circuit breaker. Such faults would cause operation of the differential relays 50 and 51 at both sides of the bus tie breaker A in the same manner and for the same reasons as described with respect to Fig. 3 and, accordingly, bus tie breaker A and breakers B and C at both sides of breaker A would be opened, as is required for this type of fault.

In the circuit breaker of Fig. 4, the metallic dome structure 75 of the circuit breaker A is connected to the line terminal 33 of the current transformer assembly and is locally insulated from the other terminal 31, all in a manner corresponding to that disclosed in Fig. 1. Hence, any faults occurring from any portion of the dome structure to ground would appear to the current transformer windings 42 and 43 as external faults on the right hand side of the bus tie breaker A. Accordingly, only differential relay 51 would be operated, while the differential relay 50 would remain inactive, as is desired.

Figs. 7, 7a and 8 illustrate still another modification of protective equipment constructed in accordance with the present invention. More specifically, in Fig. 7 there is shown a current transformer assembly which may be used to form a support for the circuit interrupter in a manner such as is shown in Fig. 1. Parts of Figs. 7 and 8 which correspond to similar parts in Figs. 1 and 2 have been given corresponding reference numerals. Since the current transformer assembly housing forms a support for the circuit interrupter, its protective equipment should cause the circuit breakers to operate in the same manner as described with respect to the embodiment shown in Figs. 1–3. That is, for faults occurring internal to the current transformer assembly, the remote breakers on both sides, as well as the bus-tie breaker itself, should open.

Referring now to Fig. 7, it will be observed that the internal power circuit of the current transformer assembly is formed by the looped primary conductor 80 of a conventional eye-bolt current transformer construction. This primary conductor is surrounded in a conventional manner by insulation 81 in the configuration of an eye-bolt extending throughout the major portion of the length of the internal circuit. To aid in producing correct operation of the associated protective equipment, there is provided about the lower portion of the internal circuit a generally toroidal conductive shielding structure 82. This shielding structure 82 is formed with a discontinuity 83 in a location disposed electrically between the current transformer windings 42 and 43. This discontinuity 83 prevents the shielding structure 82 from forming a short circuited conductor extending through and between the magnetic circuits of windings 42 and 43. The upper portion of shielding 82 is provided with a tubular upwardly-extending neck portion 84 which encompasses the insulation disposed about the primary conductor, as may be seen more clearly in the cross-sectional view of Fig. 7a. This particular construction of shielding described above lends itself to economical assembly with the eye-bolt type of current transformer construction.

The shielding 82 is grounded by means of a conductor 86 extending from ground to a portion of the shielding 82 disposed outside of, and to either side of, the zone of overlap which extends between the two windings 42 and 43, whereby to form a fault path which extends to ground electrically outside of the overlap zone. The construction of this shielding is shown schematically in Fig. 8 wherein the discontinuity 83 separates the portions of shielding 82 which would be exposed to direct faults within the overlap zone extending between windings 42 and 43, and also prevents the shielding 82 from becoming a short circuited conductor extending through windings 42 and 43.

From the above description it will be apparent that the overlap zone of the primary conductor 80 constitutes an intermediate zone located between two terminal zones of the primary conductor. Shielding 82 comprises a discontinuous first portion disposed below the windings 42 and 43 and extending about the primary conductor in this intermediate zone. Shielding 82 further comprises a continuous second portion disposed above windings 42 and 43 and extending from opposite ends of the first portion and along sections of the terminal zones of the primary conductor. The continuous second portion of the shielding is connected to ground only by the conductor 86 which forms a path disposed electrically at a terminal zone side of the current transformer windings.

For purposes which will appear more clearly hereinafter, a pair of normally deenergized current transformer windings 87 and 88 encompass the conductor 86 which forms the fault path to ground. Winding 87 is connected in the differential protective circuit 62 at the right hand side of the breaker A, whereas winding 88 is connected in the differential protective circuit 60 at the left hand side of the breaker A. Specifically, winding 87 is connected in differential protective circuit 62 across the terminals of winding 42 with its polarity preselected in such a manner that whenever fault current flows through the ground path 86 so as to energize winding 87, the current flow in the circuit 62 will be such as to operate relay 51. Similarly, winding 88 is connected in the differential protective circuit 60 across the terminals of winding 43 with its polarity preselected in such a manner that whenever fault current flows through the ground path 86 to energize winding 88, the current flow in the circuit 60 will be such as to operate relay 50.

This relationship of polarities and the correct operation of the protective equipment may be illustrated by considering the performance of the protective equipment when a fault occurs at Y when power is assumed to be flowing from circuit 14 through bus section 12 to bus section 11, as is indicated by the arrow 100 in Fig. 8. Under such conditions, windings 63, 42 and 87 would receive full fault current, which would induce a current flow in the respective secondary windings as indicated by the arrows adjacent each of these windings 63, 42 and 87. From Fig. 8 it will be seen that secondary current from the windings 42 and 87 may be considered as merely circulating between these two windings so that they are in effect neutralized, thereby permitting current from winding 63 to operate relay 51. With regard to the other differential relay 50, assuming still that a fault occurs at Y while power is flowing in the direction of arrow 100, windings 43 and 88 would receive full fault current, whereas winding 61 would receive zero fault current. The currents from winding 43 and 88 would be additive and would operate relay 50. In summary, for a fault occurring within the current transformer assembly at Y, it will be apparent from this description that differential relays on both sides of the bus tie breaker A would operate, as is desired. For all faults occurring internal to the current transformer assembly, the same operation of the differential relays would take place regardless of the location of the ground fault to the shielding 82, that is, differential relays 50 and 51 on both sides always would operate. To further illustrate this characteristic in Fig. 8, assume that a fault occurs at Z, instead of at Y, when power is flowing in the direction of arrow 100. Windings 87 and 63 receive full fault current whereas winding 42 would receive zero fault current. The secondary currents from windings 87 and 63 would be additive and would operate relay 51. With regard to the other differential relay 50, windings 43 and 61 would each receive zero fault current whereas winding 88 would receive full fault current. The secondary current from winding 88 alone would thus be effective to operate relay 50. Thus, it will be apparent that the desired relaying will take place regardless of the location of the fault in the internal circuit of the current transformer assembly.

The circuit breaker of Figs. 7 and 8 is protected against faults occurring along its operating rod 28 in the same manner as described with respect to the breaker of Figs. 1–3. That is, for such faults, remote breakers on both sides of the bus-tie breaker A will be opened. Similarly, the metallic dome 22 of the circuit breaker is connected to the line terminal 33 of the current transformer assembly in the same manner as described with respect to Fig. 1, whereby faults from this dome to ground will be correctly relayed as external faults by the proper differential relay (51).

Another advantage of a current transformer assembly constructed in accordance with the present invention is that the assembly readily lends itself to effective utilization in a power system employing automatically reclosing circuit breakers. More particularly, in all of the described modifications, it would be undesirable to reclose any one of the circuit breakers A, B, or C after the occurrence of a fault wtihin the current transformer assembly housing 35 until after inspection so that any damage resulting from the fault had been corrected. Such reclosing can be conveniently prevented by energizing any conventional disabling means for the circuit breaker reclosing control (not shown) from a suitable current transformer winding disposed about the conductor leading from the shielding to the grounded tank. Fault currents flowing through this conductor would energize this winding, thereby operating the reclosing control disabling means. If the circuit breakers are not of the automatically reclosing type, an alarm can be energized by a similar winding responsive to such fault currents, thereby to warn the operator that the circuit breakers should not be reclosed.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In a circuit breaker assembly of the type comprising a circuit interrupter having spaced terminals and a current transformer assembly insulating housing mounted adjacent said interrupter and at least partially enclosing a loop-shaped internal circuit electrically connected to one of said terminals, a pair of current transformer secondary windings mounted within said insulating housing and about said internal circuit in electrically spaced relationship, conductive shielding insulatingly interposed between each of said windings and said internal circuit, conducting structure providing a path to ground which extends from said shielding to ground electrically between said windings, and means including said shielding for forcing substantially all faults which occur in said internal circuit to flow to ground through said conducting structure whereby substantially all faults within said insulating housing will flow to ground through said path extending electrically between said windings.

2. The combination of claim 5 in which said circuit interrupter comprises an enclosing housing having a portion thereof supported on the insulating housing for the current transformer assembly.

3. In combination, a circuit interrupter having separable contacts; a current transformer assembly disposed at one side of said circuit interrupter and comprising an insulating housing, a line terminal, a circuit interrupter terminal connected to one of said contacts, and a primary conductor extending internally to said housing between said terminals; a pair of current transformer windings spaced from said terminals and mounted within said housing about said primary conductor, conductive shielding insulatingly interposed between said primary conductor and each of said windings, conducting structure providing a path to ground which extends from said shielding to ground electrically at the line terminal side of said pair of windings, means including said shielding for forcing substantially all faults which occur in the portion of the power circuit extending between said contacts and said line terminal to flow to ground through said path extending electrically at the line terminal side of said windings.

4. The combination of claim 3 in which said circuit interrupter comprises an enclosing housing provided with means for supporting said enclosing housing substantially independently of said current transformer assembly housing.

5. In combination, a circuit interrupter having separable contacts; a current transformer assembly disposed adjacent said circuit interrupter and comprising an insulating housing, a line terminal, a circuit interrupter terminal connected to one of said contacts, and a primary conductor extending internally to said housing between said terminals; a pair of current transformer windings spaced from said terminals and mounted within said housing about said primary conductor, conductive shielding insulatingly interposed between said primary conductor and each of said windings, conducting structure providing a path to ground which extends from said shielding to ground electrically between said windings, means including said shielding for forcing substantially all faults which occur in the portion of the power circuit extending between said contacts and said line terminal to flow to ground through said path located electrically between said windings, and a metallic enclosure mounted about said circuit interrupter terminal and electrically connected to said primary conductor at the line terminal side only of said primary conductor.

6. A current transformer assembly comprising an insulating housing, spaced terminals, and a primary conductor extending internally to said housing between said terminals, a pair of current transformer windings mounted about said primary conductor, an intermediate zone of said primary conductor extending between said windings, terminal zones of said primary conductor, each extending from one terminal of current transformer assembly to said intermediate zone, conductive shielding insulatingly interposed between said primary conductor and said windings, a discontinuous first portion of said shielding extending about said primary conductor in the intermediate zone, a continuous second portion of said shielding extending between opposite ends of said first portion and along sections of the terminal zones of said primary conductor, conducting means providing a conductive path between said continuous second portion and ground, said path being disposed electrically at a terminal zone side of said current transformer windings, and means including said shielding for forcing substantially all faults from said primary conductor to flow to ground through said conductive path.

7. The assembly of claim 6 in which the conductive path provided by said conducting means is the sole conductive path between said shielding and ground.

8. In combination, a circuit interrupter having spaced terminals and separable contacts, a current transformer assembly disposed adjacent said interrupter and comprising an insulating housing, spaced terminals, one of which is connected to one of said interrupter terminals, and a primary conductor extending internally to said housing between said current transformer terminals, a pair of windings mounted about said primary conductor, an intermediate zone of said primary conductor extending between said windings, terminal zones of said primary conductor each extending from one terminal of the current transformer assembly to said intermediate zone, conductive shielding insulatingly interposed between said primary conductor and said windings, a discontinuous first portion of said shielding extending about said primary conductor in the intermediate zone, a continuous second portion of said shielding extending from opposite ends of said first portion and along sections of the terminal zones of said primary conductor, conducting means providing a conductive path between said continuous second portion and ground, said path being disposed electrically at a terminal zone side of said current transformer windings, means including said shielding for forcing substantially all faults which occur in the portion of the power circuit extending between said contacts and said line terminal to flow to ground through said path, means including a pair of protective circuits respectively operable to interrupt power flow into said circuit interrupter through different ones of its terminals, each of said protective circuits including a different one of said windings, a pair of normally deenergized current transformer windings disposed about said conductive path, and means operably connecting different ones of said normally deenergized windings into different ones of said protective circuits for operating said protective circuits in response to energization of said normally deenergized windings.

9. The combination of claim 8 in which the conductive path provided by said conducting means is the sole conductive path between said shielding and ground.

10. In a circuit breaker assembly of the type comprising a circuit interrupter having separable contacts and a current transformer assembly insulating housing mounted at one side of said interrupter and at least partially enclosing an internal circuit electrically connected to one of said contacts, a pair of current transformer secondary windings mounted within said insulating housing and about said internal circuit in electrically spaced relationship, conductive shielding insulatingly interposed between each of said windings and said internal circuit, conducting structure extending from said shielding to ground by a path disposed in a predetermined electrical location with respect to said windings, means including said shielding for forcing substantially all faults which occur in said internal circuit to flow to ground through said conducting structure whereby substantially all faults within said insulating housing will flow to ground through said predetermined path, and a metallic enclosure mounted about a portion of the electrical connection between said internal circuit and said contacts, said metallic enclosure being connected to said internal circuit solely at an electrical side of said current transformer assembly opposite to the electrical location of said contacts.

11. In a current transformer assembly, a housing comprising a metallic tank and a tube of insulating material having one end mounted adjacent the tank, a pair of spaced-apart terminals disposed at the other end of said tube, a primary conductor interconnecting said terminals and disposed internal to said housing, the primary conductor having a first portion located within said tank and having second portions extending within said tube, a pair of current transformer windings mounted about said first portion, said windings being disposed in said tank external to said tube, insulation surrounding said primary conductor, conductive shielding disposed about said insulation and extending through said current transformer windings, conductive structure connecting said shielding to ground and extending in a path disposed in a predetermined electrical location with respect to said windings, and means including said shielding for forcing substantially all faults internal to said housing to flow to ground by said predetermined path.

12. The assembly of claim 11 in which said path is disposed electrically between said windings.

13. The assembly of claim 11 in which said path is disposed electrically at a terminal side of both of said windings.

14. In combination, a circuit breaker having spaced terminals, separable contacts, and an insulating member movable to separate said contacts; a power circuit having a portion extending internally to said circuit breaker between said spaced terminals and a portion extending externally to said circuit breaker; a first current transformer winding mounted about said internal portion of the power circuit and a second current transformer winding mounted about said external portion of the power circuit; differential protective means including said current transformer windings, said protective means being operable to effect interruption of power flow into said breaker through one of its terminals in response to faults in a protected zone of the power circuit extending between said current transformer windings; said insulating member being located in such a position as to form a possible current path for faults occurring within said internal portion of the power circuit at locations outside of said protected zone; a grounded shield mounted adjacent said insulating member so as to intercept said insulating member fault currents; a third current transformer winding mounted about said shield so as to be energized by fault current flowing in said shield, and means connecting said third winding in circuit with said first current transformer winding for operating said protective means in response to energization of said third winding.

15. In combination, a circuit breaker having spaced terminals, separable contacts, and an insulating member movable to separate said contacts; a power circuit having a portion extending internally to said circuit breaker between said spaced terminals and a portion extending externally to said circuit breaker; a first current transformer winding mounted about said internal portion of the power circuit and a second current transformer winding mounted about said external portion of the power circuit; differential protective means including said current transformer windings, said protective means being operable to effect interruption of power flow into said breaker through one of its terminals in response to faults in a protected zone of the power circuit extending between said current transformer windings; said insulating member being located in such a position as to form a possible current path for faults occuring within said internal portion of the power circuit at locations outside of said protected zone; a normally deenergized third current transformer winding mounted about said insulating member so as to be energized by fault currents flowing along said insulating member; and means electrically coupling said third winding to said first winding for operating said protective means in response to energization of said third winding.

16. In a protective system, an insulating casing defining a circuit interrupting chamber, a pair of separable contacts mounted within said chamber, an insulating operating member coupled to one of the contacts and movable to separate said contacts; a current transformer assembly disposed at one side of said circuit interrupter chamber and comprising an insulating housing, a line terminal, a circuit interrupter terminal connected to one of said contacts, and a primary conductor extending internally to said housing between said terminals; a second conductor extending from said line terminal externally to said housing, said conductors constituting portions of a power circuit, a first current transformer winding mounted within said housing about said primary conductor, a second current transformer winding mounted about said second conductor, a differential protective circuit including said windings for sensing faults in a protected zone of the power circuit extending between said windings, said operating member being located in such a position as to form a possible breakdown path for currents resulting from faults in said power circuit occurring at locations outside of said protected zone, a grounded shield mounted adjacent said switch member so as to intercept said switch member fault currents, a third current transformer winding mounted about said shield, and means connecting said third winding in said differential protective circuit for rendering said protective circuit sensitive to said switch member fault currents.

17. Protective equipment for an electric power circuit comprising an electric circuit breaker having a pair of spaced line terminals, an internal portion of the power circuit extending between the terminals of the circuit breaker, said circuit breaker having a pair of separable interrupting contacts in said internal circuit and an insulating operating member coupled to one of said contacts and movable to separate said contacts, a pair of current transformer windings disposed at spaced points about said power circuit and connected in a differential protective circuit whereby the portion of said electric power circuit extending between said spaced points constitutes a differentially protected zone, said zone including one of said terminals and a portion only of said internal circuit, a grounded conductive shield disposed adjacent said insulating operating member and defining a breakdown path to ground for faults occurring in said internal circuit outside of said protected zone, a third current transformer winding disposed about said conductive shield and connected in said differential protective circuit.

18. In a circuit breaker assembly, a circuit interrupter having separable contacts, a current transformer assembly mounted at one side of said interrupter, said current transformer assembly comprising an insulating housing, a line terminal, a circuit interrupter terminal, and an internal circuit extending between said terminals within said housing, a length of conductor electrically interconnecting said contacts and said circuit interrupter terminal, exposed metal shielding electrically connected to said line terminal and arranged to enclose both of said terminals and to extend about at least a portion of said length of conductor so as to preclude faults from said length of conductor to ground, the sole electrical connection between said length of conductor and said exposed metal being through said primary conductor and the connection between said line terminal and said exposed metal.

19. In combination, electrical apparatus having spaced terminals, a power circuit having a portion extending internally to said apparatus between said spaced terminals and a portion extending externally to said apparatus, a first current transformer winding mounted about said internal portion of the power circuit and a second current transformer winding mounted about said external portion of the power circuit, differential protective circuit means including said current transformer windings for sensing faults in a protected zone of the power circuit extending between said windings, insulating structure located in such a position as to form a possible breakdown path for faults occurring within said internal portion of the power circuit at locations outside of said protected zone, a third current transformer winding mounted about said insulating structure, and means connecting said third winding in differential circuit relationship with said first winding for rendering said differential protective means sensitive to faults along said insulating structure.

20. The organization of claim 19 in combination with a grounded shield mounted adjacent said insulating structure and extending through the magnetic circuit of said third current transformer winding whereby said shield is arranged to conduct fault current from said insulating structure to ground by a path extending through the magnetic circuit of said third winding.

21. In combination, electrical apparatus, means for connecting said apparatus in circuit with a source of power, a first current transformer winding associated with said apparatus, a protective circuit including said winding and responsive to predetermined fault conditions to effect isolation of said apparatus from the source of power, a second normally-deenergized current transformer winding so disposed that any current passing to ground over a preselected portion of the insulation of said apparatus will pass through and energize said second winding, means connecting said second winding into said protective circuit for modifying the operative response of said protective circuit as a result of current passing over said preselected portion of insulation.

22. The apparatus of claim 1 in combination with a pair of overlapping protective circuits each including one of said windings, first differentially-operated protective means operable by one of said protective circuits to interrupt power flow into said interrupter through one of its terminals, and second differentially-operated protective means operable by the other of said protective circuits to interrupter power flow into said interrupter through its other terminal.

23. In an electrical system having the apparatus of claim 3 connected in circuit with a source of power at each electrical side of said interrupter, a pair of protective circuits each including one of said windings, first differentially-operated protective means operable by one of said protective circuits to isolate said interrupter from the power source at one side of the interrupter, and second differentially-operated protective means operable by the other of said protective circuits to isolate said interrupter from the power source at the other side of the interrupter.

24. In an electrical system having the apparatus of claim 5 connected in circuit with a source of power at each electrical side of said interrupter, a pair of overlapping protective circuits each including one of said windings, first differentially-operated protective means operable by one of said protective circuits to isolate said interrupter from the power source at one side of the interrupter, and second differentially-operated protective means operable by the other of said protective circuits to isolate said interrupter from the power source at the other side of the interrupter.

25. In a current transformer assembly, an insulating housing comprising a pair of separate insulating compartments, a U-shaped primary conductor having a pair of spaced apart arms each of which extends through a different one of said compartments, a pair of current transformer secondary windings mounted about said primary conductor in electrically spaced relationship, conductive shielding insulatingly interposed between each of said windings and said primary conductor and extending into said compartments, conducting structure providing a conductive path to ground which extends from said shielding to ground electrically between said windings, and means including said shielding for forcing substantially all faults within said housing to flow to ground through said path extending electrically between said windings.

26. In a current transformer assembly, an insulating housing, a pair of spaced-apart terminals mounted adjacent one end of said housing, a U-shaped primary conductor extending within said housing between said terminals, a pair of current transformer secondary windings mounted about said primary conductor in electrically-spaced relationship at locations spaced from said terminals, conductive shielding insulatingly interposed between each of said windings and said primary conductor, conducting structure providing a conductive path to ground which extends from said shielding to ground electrically between asid windings, and means including said shielding for forcing substantially all faults which occur within said housing at a terminal side of either of said windings to flow to ground via a path which extends through the magnetic circuit of the particular winding adjacent which the fault occurs and also through said conducting structure.

27. The current transformer assembly of claim 26 in which said U-shaped primary conductor comprises a pair of spaced arms extending between said terminals and the location of said windings, and in which said housing comprises a pair of separate insulating compartments respectively encompassing said arms.

References Cited in the file of this patent

UNITED STATES PATENTS

| | | |
|---|---|---|
| 1,652,559 | Cole | Dec. 13, 1927 |
| 1,914,395 | Austin | June 20, 1933 |

FOREIGN PATENTS

| | | |
|---|---|---|
| 904,761 | France | Nov. 15, 1945 |
| 123,160 | Switzerland | Nov. 9, 1948 |